Figure 1:
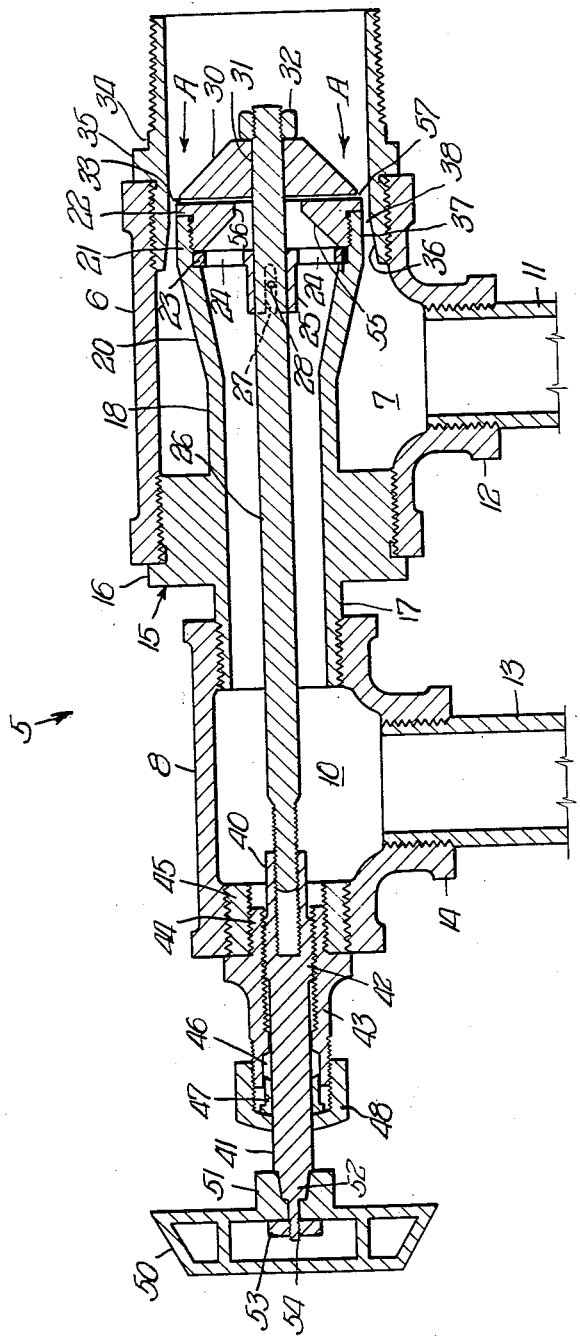

2,805,966

STARCH PASTING PROCESS AND APPARATUS

Oliver R. Etheridge, Decatur, Ill., assignor to A. E. Staley Manufacturing Company, Decatur, Ill., a corporation of Delaware Application February 19, 1953, Serial No. 337,860

9 Claims. (Cl. 127—32)

The present invention pertains to certain innovations and improvements in methods of and apparatus for pasting or cooking starch. The invention also relates to the utilization of such innovations and improvements in the manufacture of paper having improved characteristics.

The term "starch" as used hereinafter and in the appended claims designates broadly and inclusively not only corn-starch which is the most common and commercially important type of starch in this country, but also other types of starch including potato, rice, tapioca, wheat, waxy maize and arrowroot starches. One of the most important usages of starch is as an adhesive or binder material. Raw or uncooked starch has little or no adhesiveness or binding properties. However, aqueous slurries of starch may be cooked or pasted with or without the presence of various modifying agents such as alkalies, acids, or enzymes, so as to develop or bring out the inherent adhesive properties of the starch.

Starch and starch base adhesives are used in large volumes for a wide variety of commercial purposes. For example, large quantities of starch are required in the paper industry where the starch is used both as a size or filler for the paper stock itself and also in various coatings and finishes for the paper. The textile industry consumes large quantities of starch wherein it is used as a sizing material in the manufacture of textile fabrics. The Nation's laundries use large quantities of starch. Starch is also used in a wide variety of glues, paints and gums. Such adhesive products are used in large quantities in connection with the production of paperboard boxes, wallboard, labels, plywood and plastics. There are many other uses of starch for adhesive purposes which are too numerous to mention.

Raw starch is composed of small granules which are tough and relatively insoluble in cold water. The individual granules cannot be seen with the naked eye but can be seen under the microscope. If a water slurry of uncooked starch granules is heated sufficiently, the starch granules will swell. However, there will be little, if any, swelling of the granules until a minimum temperature is reached which is somewhat different for each type of starch, being about 140° F. for corn-starch. At such minimum temperature the swelling of the starch granules becomes pronounced. These changes will continue either slowly or rapidly depending on the temperature until eventually the granular structure of the starch is no longer detectable. The swelling of the starch may be arrested at any particular stage of modification by cooling it to a temperature whereat little or no further swelling takes place.

Careful studies have shown that the starch granules follow a fairly definite and characteristic pasting curve or pattern when they are heated. The granules of different types of starch have their own characteristic pasting curves or patterns. One of the first changes noticeable under the microscope is the swelling or enlargement of the starch granules and this is associated with solution of a small proportion of the starch substance. The swelling action is indicated or manifests itself by a rapid increase in the viscosity of the starch slurry. As the heating continues and the granules continue to swell, they become more tender and fragile to the point where their disintegration can be materially speeded by mechanical agitation. This structural break-down is more effective on granules which have been exposed to combinations of longer times and higher temperatures. There is a limit to the swelling of the starch granules which averages about four or five times the diameter of the raw granules. Where a granule has been swollen to maximum size, continued exposure to elevated temperature weakens the granule structure until it begins to break up into fragments, first large fragments and then smaller and smaller fragments until finally the granule structure is no longer identifiable.

Without in any way limiting the invention, it may be said that there are three principles or characteristic features of the present invention. First, the pasting process is continuous. Second, the pasting period is extremely short so that for practical purposes it can be said to be almost instantaneous and at the most not to extend for more than a few seconds. Third, a thin jet of steam at a stage or condition where it has a very high velocity but relatively low pressure continuously and uniformly impinges on or intersects a thin stream of starch slurry preferably at an angle of approximately 90°, and then the mixture of steam and starch slurry flows into a turbulent zone of enlarged cross-section.

The thin jet of steam should be traveling at a very high velocity in the order of 1500–2000 feet per second so that it strikes the thin film of starch slurry with a high degree of impact or shock. Preferably, the stream of starch slurry is in the form of a thin annular cylindrical film and the steam takes the form of an outwardly expanding thin disk or conically-shaped jet expanding from the center or central axis of the cylinder or tube form of the annular film of starch and striking the film of starch slurry at an angle of approximately 90°.

Generally stated, the object of the present invention is the provision of means and method whereby starches and similar mucilaginous substances may be pasted in such a manner that a large or predominant portion of the total number of individual particles or granules are brought to the same predetermined point or stage on the pasting curve or pattern so that on an over-all basis the slurry will exhibit properties including adhesiveness, viscosity and tenderness which correspond to the same properties exhibited by the individual granules at that point in the curve or pattern.

One object of the invention is to paste starch by a process and in an apparatus wherein at least a majority of the granules are controllably and uniformly altered to the same degree so that the physical properties of the resulting paste correspond very closely to the theoretical physical properties associated with a point on the pasting curve of an individual granule of starch.

Another object of the invention is the process of pasting starch comprising expanding steam in a nozzle passage having an expansion ratio of at least two from a pressure substantially in excess of atmospheric so as to form a thin high velocity jet of steam traveling at a speed in the order of, say, 1500–2000 feet per second with a pressure at or near atmospheric and directing the jet at approximately right angles crosswise into a thin stream of starch slurry and then immediately passing the resulting mixture of steam and starch into a turbulent zone of relatively large cross-section wherein the desired thermal pasting is completed in a fraction of a second.

Another object of the invention is a process of pasting starch in such a way that practically all of the component granules thereof are altered to substantially the same degree or point on the characteristic pasting curve as distinguished from a starch paste in which the component granules exhibit a wide range of variation in properties and degree of pasting, such process comprising creating a thin sleeve-like or tubular stream of starch and impacting this stream from the interior with a thin disk-like or flat cone-like radially expanding jet of steam of very high velocity at an angle of approximately 90° to the direction of flow.

Another object of the invention is a device for pasting starch so that substantially all of the component granules are uniformly and similarly altered to substantially the same degree and which comprises a chamber for receiving an aqueous starch slurry through an inlet port and having a discharge outlet in the form of an annular passageway, the walls of which are defined between the outlet opening of the chamber and a steam nozzle which is positioned therewithin, the outlet passageway of steam nozzle taking the form of a frusto-conical shaped member, the base or flat side of which is adjustably spaced relative to the flat face of a nozzle ring whereby the thin disk-shaped nozzle passage formed between the two nozzle elements serves to permit the escape of the steam from the interior of the nozzle in the form of a radially expanding, disk-shaped jet of thin cross-section which impinges or impacts the stream of starch slurry at approximately 90° angle to the direction of starch flow.

Another object of the invention is the production of pasted starch characterized by the body of starch paste exhibiting physical characteristics with respect to viscosity, adhesiveness and granule tenderness which correspond closely to the same properties associated with one of the points on the pasting curve or pattern for the particular type of starch granule. Otherwise stated, this object of the invention is the provision of a starch paste wherein at least a high percentage (e. g., 80%) to nearly all of the component starch granules has been altered to the same extent so that they exhibit substantially the same properties, which properties for the individual granules are reflected and exhibited by the starch paste as a body.

Another object of the invention is the improvement in the manufacture of paper by the wet process which comprises introducing into the stock or furnish, preferably at the fan pump or adjacent the head box, a starch slurry wherein the starch has been pasted in such a way that at least a large percentage of the starch granules have all been altered to substantially the same degree so that the over-all physical properties of the paste correspond closely to the properties of the individual component granules.

Still another object of the invention is the improvement in the production of paper by the wet process wherein a slurry of swollen starch granules is introduced into the paper stock or furnish, the component starch granules of which have been pasted or cooked under substantially identical conditions so that on an over-all basis the component granules are swollen or altered to the same extent, this swelling being carried to the point that the granules have sticky surfaces and have been swollen to diameters such that practically all of them are retained in the water-laid web without passing through, but with the pasting or cooking being arrested short of complete disruption of the granules so that they will become further swollen and pasted by reason of the heat to which the paper web is normally subjected as it passes over the drier rolls and the calender rolls of the Fourdrinier machine.

Still another object of the invention is the provision of paper of high quality especially in respect to internal bonding, folding strength, absence of fuzz, and improved printing properties, such improved qualities being obtained by introducing into the stock or furnish at some suitable point where all modification of the pulp is considered complete a continuously pasted slurry of starch granules wherein at least a very high percentage of the individual starch granules have been swollen or pasted to the same point or degree whereat the granules have sticky surfaces and are swollen appreciably so that they are retained in the water-laid web so as not to pass therethrough and which are further pasted or altered during the paper making process as the web passes over the drying rolls and through the calenders.

Certain other objects of the invention will, in part, be obvious and will, in part, appear hereinafter.

Figure 2:
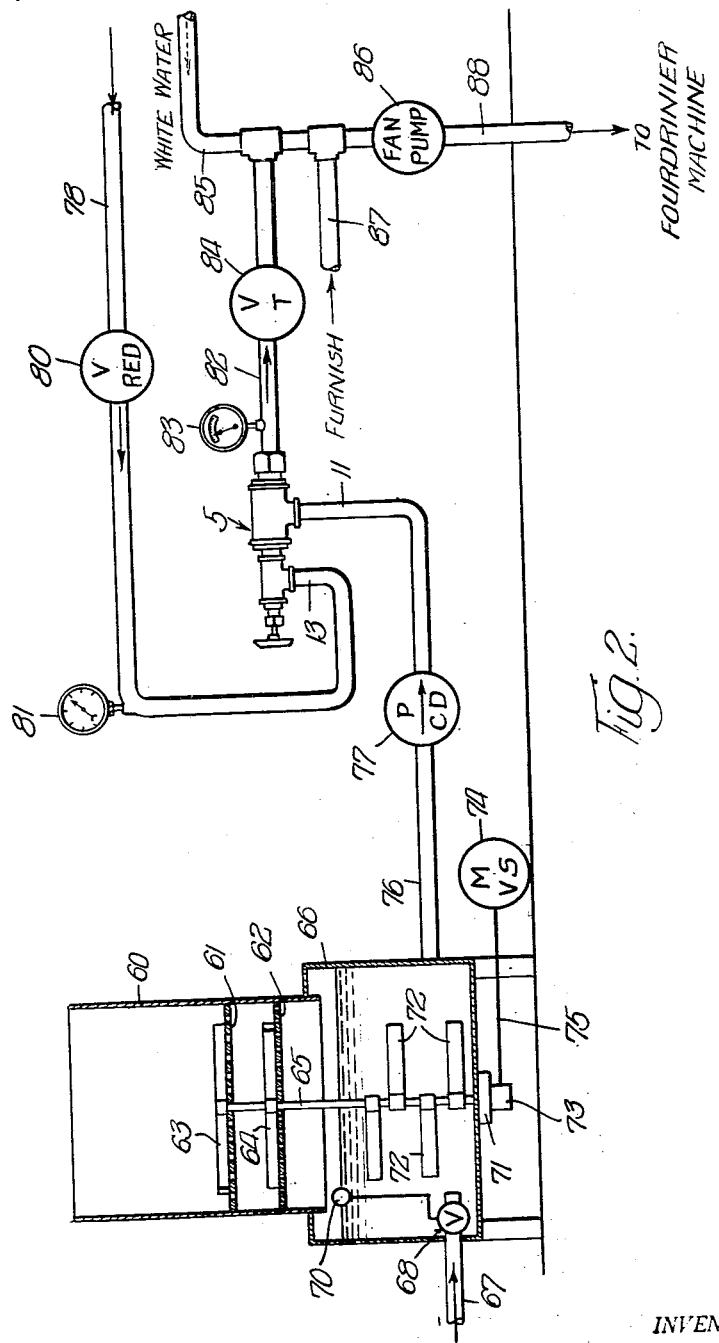

For a more complete understanding of the nature and scope of the invention, reference may now be had to the following detailed description thereof taken in conjunction with the accompanying drawings, wherein:

Fig. 1 is a longitudinal sectional view through a starch pasting device which forms one embodiment of the invention and in which starch may be pasted or thermally modified in accordance with the process of the present invention; and Fig. 2 is a diagrammatic view of apparatus for producing a starch slurry and delivering it to the continuous starch paster such as shown in Fig. 1 from which it is discharged into the stock or furnish line leading to a Fourdrinier machine.

Referring to Fig. 1 of the drawings, a continuous type starch cooker or paster made in accordance with the present invention is indicated generally at 5. The device 5 comprises a T-fitting 6, the interior of which provides a starch slurry compartment 7, and a smaller T-fitting 8, the interior of which provides a compartment 10 for the high pressure steam required to operate the device. Starch slurry is introduced into the compartment 7 through a delivery pipe 11 which is screwed into the side nipple 12 of the fitting 6. In like manner, steam is introduced into the compartment 10 through line 13 which is screwed into the side fitting 14 of the T-fitting 8. The T-fittings 6 and 8 are interconnected in coaxial and spaced alignment by means of a steam nozzle body indicated generally at 15. The body 15 is integrally formed in one piece and comprises an intermediate, large diameter plug portion 16 which is exteriorly threaded so as to screw into one of the ends of the T-fitting 6, as shown. A nipple portion 17 extends rearwardly from the outer end of the plug portion 16 and is externally threaded so as to screw into the adjacent end of the T-fitting 8, as shown. The nozzle body 15 also has an integrally formed nozzle portion 18 which extends coaxially within the chamber 7 of the T-fitting 6. The end of the nozzle portion 18 expands or flares out into the portion indicated at 20 and terminates in a cylindrical end portion 21 which is internally threaded so as to receive a nozzle ring 22 which serves as one of two components forming the nozzle outlet.

A spider member 23 is seated within the cylindrical end portion 21 of the nozzle body 15 and is retained in place therein by means of the nozzle ring 22. The spokes 24—24 of the spider member 23 support an elongated hub member 25 which serves as a sleeve bearing for supporting one end of a nozzle control rod 26 which is slidable in the hub 25. Diametrically aligned slots 27—27 are cut longitudinally into opposite sides of the hub member 25 so as to receive the projecting ends of a pin 28 which extends crosswise through the rod 26 and projects on opposite sides thereof. The projecting ends of the pin 28 engage in the slots 27 and prevent the rod 26 from rotating while permitting it to slide longitudinally within the hub 25. On its outer end the rod 26 carries a frusto-conical shaped nozzle head 30 which fits over the tapered end portion 31 of the rod 26 and is retained in place by means of a nut 32 which is screwed over the threaded end of the rod, as shown.

As will be explained more fully below, the nozzle ring member 22 and the nozzle head member 30 cooperate to provide a disk-shaped radially expanding nozzle passage between the opposing faces thereof, this passage being indicated at 33. While the width of the passage 33 may be adjusted as will be explained presently, it is normally set so as to have a width of approximately fifteen to forty thousandths of an inch. The nozzle passage 33 has an expansion ratio of at least two to one, this being the ratio between the area where the steam leaves the passage 33 to the area where the steam enters this passage.

The nozzle construction or assembly is completed by a coupling 34 which is exteriorly threaded on opposite ends with an intermediate shoulder 35 which screws up against the adjacent end of the T-fitting 6, as shown. The interior of the inner end of the coupling 34 is outwardly flared so as to provide a flared or conical surface 36 which cooperates with the opposing cylindrical surface 37 on the end 21 of the nozzle body 15. These circumferential surfaces together provide a narrowing annular passageway 38 having a width at the discharge end in the order of thirty thousandths of an inch through which passageway in operation of the paster 5 a thin sleeve-like, cylindrically-shaped stream of starch slurry flows around and over the outlet opening of the nozzle passage 33.

The outer end of the fitting 34 is exteriorly threaded so that it may receive the end of a conduit pipe through which the pasted starch slurry may be discharged.

The rear end of the nozzle adjusting or control rod 26 is exteriorly threaded and screwed into the tapped end 40 of a valve stem 41. The valve stem 41 is exteriorly threaded at 42 so as to screw within a thimble 43. The thimble 43 is interiorly threaded on its inner end for receiving the valve stem 41 and is exteriorly threaded on the same end 44 so as to screw in an adapter ring 45 which is screwed into the adjacent end of the T-fitting 8, as shown. An annular recess 46 is provided in the outer end of the valve fitting 43 which serves to receive packing which may be compressed therein by means of a gland 47. The gland 47 is acted upon by a valve bonnet member 48 which is interiorly threaded as shown, so as to screw on the adjacent end of the valve thimble 53.

The valve stem 41 is provided on its outer end with a hand wheel 50 having a hub portion 51 which may be retained on the end 52 of the valve stem by means of a nut 53 screwed over the threaded end portion 54 of the valve stem.

When the handle 50 is rotated in a clockwise direction as viewed from the left-hand or rear end of the pasting device 5, the valve stem 41 turns within the stationary thimble 43 and thereby shifts toward the right or toward the front end of the pasting device 5. The pitch of the threads on the threaded portion 42 of the valve stem 41 is greater than the pitch of the threads on the interior of the threaded end portion 40 which receives the threaded end of the nozzle adjusting rod 46. The threads on the end of the rod 26 are similarly directed with respect to the threads on the valve stem 41 at 42. Accordingly, since the rod 26 is prevented from turning by means of the pin 28 fitting within the slots 27, the turning of the valve stem 41 will also shift the rod 26 to the right or to the front and thereby serve to widen the nozzle space 33 but forward movement or shifting of the rod 26 will be less than the forward movement of the valve stem 41 since part of the forward movement of the latter element is lost due to the turning in the same direction of the stem 41 on the threaded end of the valve rod 26. For example, if the threads on the threaded portion 42 of the valve stem 41 have a pitch of 1/18 of an inch, which is a standard pitch, and the threads on the interior of the valve stem 41 have a pitch of 1/32 of an inch, which is also a standard pitch, then the net shifting of the rod 26 will be the same as would be produced by a single screw and nut action wherein the threads have a pitch of approximately 1/41 of an inch, a non-standard pitch. It will thus be seen by selecting standard pitches for the threads on the threaded portion 42 of the valve stem 41 and on the inner end of the portion 40, a non-standard differential or effective pitch, the equivalent of a very fine thread, can be obtained allowing precise adjustment of the width of the nozzle passage 33. Another advantage of this differential thread action is the fact that once the valve stem 41 is set into a particular position, it will remain in that position without change so that readjustment is not required unless some change in the nozzle width 33 is desired.

The operation of the pasting device 5 shown in Fig. 1 is as follows: Aqueous starch slurry is supplied at a constant flow rate through the pipe 11 into the starch chamber 7 within the fitting 6. The starch slurry discharges from the fitting 6 through the annular passageway 38 in the shape of a thin sleeve-like or tubular stream having a thickness in the order of thirty thousandths of an inch or less, the velocity of the stream being increased where it passes over the cylindrical surface of the nozzle ring member 22 because of the venturi effect of the passageway 38. The starch slurry may flow through the passageway 38 at a velocity of the order of fifteen to twenty feet per second.

High pressure steam is admitted into the steam compartment 10 in the fitting 8 through the steam pipe 13. The steam may, for example, be under a pressure of 100 pounds per square inch gauge as admitted into the compartment 10. The steam passes through the interior of the nozzle body 15 toward the front end thereof and after passing through the openings in the spider 23, the steam enters the interior of the nozzle ring member 22 which is frusto-conical in shape as shown and indicated at 55. The steam leaves the ring member 22 through the central discharge opening 56 therein and then expands radially outwardly in a thin disk through the nozzle passage 33.

The nozzle passage 33 provides for expansion of the steam discharging therethrough. The steam enters the nozzle passage at high velocity and at a pressure of approximately 60% of the line pressure. As the steam leaves the nozzle passage 33 the pressure of the steam is decreased to near atmospheric and the velocity increases to approximately 2000 feet per second depending upon the particular conditions. During such expansion some of the thermal energy of the steam is converted to kinetic energy as manifested by the high velocity of steam before impact. It will be noted that the rim of the nozzle head 30 is not sharp but is slightly rounded as indicated at 57 and that the diameter thereof is slightly less than the diameter of the cylindrical outer surface of the ring member 22. This rounding of the outer rim of the nozzle head 30 and this slight difference in diameters tends to tilt the circumferential steam jet issuing through the passage 33 slightly forwardly thereby stabilizing the action of the paster 5 and lessening the tendency of the steam to strike back rearwardly through the annular passageway 38 against the velocity head of the starch slurry due to recompression on impact of the steam in this area.

The same result could be otherwise obtained at the expense of increased pumping cost by increasing the velocity of the tubular stream of starch slurry to the point where there would be no back surge which would upset the symmetry or balance of the jet acting on the starch slurry.

When the jet of steam impinges upon the starch slurry at such a high velocity, there is an inevitable instantaneous rise in pressure and effective temperature at the surface of impact whereby the effective heat transfer and pasting action are accelerated above the rate to be expected from a simple mixing of steam and slurry without such impact velocities. The resulting mixture of steam and starch slurry immediately moves into the expanding annular space indicated at A which is a zone of extremely high turbulence.

The starch granules receive the required energy charge for the desired modification in the fraction of a second required to pass through the active zone A. However, the response of the granule structure to this energy may well continue rapidly for several seconds and then slow down corresponding to the final equilibrium temperature in the discharge line. This secondary action can be stopped either by cooling the discharge line below the critical temperature or by continuous use of the paste as it is generated.

The drop in the pressure on the starch slurry between the point of entering the pasting device through the connection 12 and the discharge from the annular passageway 38 may be in the order of 5 to 10 pounds per square inch drop, whereas the drop in steam pressure between its inlet pressure through the side fitting 14 and the discharge pressure from the disk-shaped nozzle opening 33 may be in the order of a drop of around 100 pounds per square inch.

If it is desired to maintain a temperature of 212° or above in the discharge line, this is done by increasing the back pressure by throttling.

The through-flow of starch slurry is determined by the pump supplying the cooker which is preferably of a constant volume type. The cooking action of the cooker is regulated by adjusting the width of the nozzle passage 33 and also by control of steam pressure through a pressure regulator.

Preferably, the nozzle control rod 26 is made of stainless steel while the nozzle body 15 is made of brass. It has been found that the difference in coefficients of expansion of these two materials in this arrangement tends to close the passage 33 slightly when the steam pressure and temperature in the supply line are increased, thus promoting a stability of temperature control of the discharged paste.

The continuous starch paster or cooker 5 has been found to be a very satisfactorily operating device and one which is inherently stable in operation so that the continuously flowing stream of starch of thin cross-section is continuously impacted or struck by the high velocity and thin jet of steam so as to produce pasting of the starch in a very short space of time with only a very small volume of the starch slurry undergoing pasting at any one moment. An important advantage and feature of the paster 5 is that by merely regulating the width of the nozzle passage 33 the device may be immediately adjusted to vary the degree of pasting.

It will be understood that other pasting devices may be used having different designs but which incorporate the same principles of operation. That is, a thin stream of starch slurry is produced which is continuously impacted or struck crosswise at approximately 90° by a narrow high velocity jet of steam so that uniform pasting of the starch granules is obtained with only a relatively small number of the granules undergoing pasting at any one instant. For practical purposes, it appears that the pasting device 5 operates to cook or paste a slurry of starch in such a manner that most of the component starch granules are swollen or pasted to the same extent or degree as related to a particular point on the pasting curve or pattern for the particular starch involved.

Starch pastes having ordinary viscosity values can be obtained with the pasting device 5 by using lower concentrations of starch than are conventionally required for obtaining such viscosities. These lower starch concentrations are made possible because when the process is carried out in the pasting device 5 most of the component granules are swollen to the same degree so that the viscosity of the resulting paste is not merely representative of an over-all average of granules which have been pasted to a wide spread or extent but, on the contrary, the granules are practically all brought to the same viscosity level.

If desired, any of the common chemical modifying agents or modifying enzymes may be incorporated in the starch slurry as it is delivered through the pipe 11 into the chamber 7.

The starch pasting device 5 has been used very successfully and to advantage in connection with the manufacture of high quality paper. In the manufacture of paper, cooked or pasted starch has been conventionally introduced as a sizing agent or binder into the beater where it is mixed with the other components of the paper stock such as the pulp and fillers. From the beater the paper stock or furnish passes through various pieces of equipment, depending upon the particular paper mill, such as holding or surge tanks, blenders and pumps of different types. Generally, there is a pump, sometimes referred to as the "fan pump," which services to recirculate drain water (i. e., "white water") from the Fourdrinier machine back to the head box. The new stock or furnish may be introduced into the recirculating water ahead of the fan pump. The starch paste may be added either to the stock line or to the recirculating line. The stock flows out through the slice in the bottom of the head box onto the wet end of the Fourdrinier machine in known manner. The usual practice has been to prepare the paper stock or furnish in batches using predetermined proportions of the components including water, wood pulp, starch and other ingredients. The starch is ordinarily first pasted batchwise in a separate operation such as in a kettle provided with live steam and then the pasted starch is added or blended with the other components in the beater.

By making use of the process of the present invention and employing a pasting device such as the continuous paster 5 shown in Fig. 1 of the drawings, it has been found that the known difficulties previously encountered in connection with the pasting and introduction of the starch into the paper furnish can be eliminated and paper of noticeably improved quality may be produced. Reference may now be had to Fig. 2 for a description of apparatus and procedure which has been used in continuously pasting starch and introducing the same into the paper-making furnish as it is supplied to the paper-making machine.

Referring now to Fig. 2 of the drawings, a starch sifter is designated at 60 which comprises a hopper in the lower portion of which are located screens 61 and 62, the screen 61 usually being somewhat coarser than the screen 62. The starch is caused to pass through the screens 61 and 62 by means of rotating agitator bars or blades 63 and 64 which are carried by a vertical shaft 65. The blades 63 and 64 are mounted on the shaft 65 and extend to the opposite sides of the starch hopper 60 but with sufficient clearance being left at the ends so that there is no rubbing action against the sides of the hopper 60. The perforated plate or screen 61 may have about one-half inch mesh openings while the bottom screen 62 may have openings of about a quarter of an inch.

Starch is emptied into the top of the sifter 60 and is sifted at a fairly uniform rate into the slurry tank 66 over which the sifter 60 is supported. Water is delivered into the mixing tank 66 through a water supply line 67 leading into the bottom of the tank and provided with a valve 68 which is controlled by means of a float 70. The float control valve 68 may be of known type and operates to maintain the level of the liquid in the tank 66 at approximately the level indicated therein. The shaft 65 extends upwardly through the center of the tank 66 and is supported from the bottom of the tank by means of a suitably sealed thrust bearing 71. The shaft 65 is provided with agitator paddles 72—72 which serve to mix and agitate the starch in the tank 66 so to form a uniform aqueous dispersion or slurry thereof. The shaft 65 is driven by means of a pulley 73 on the bottom end thereof from a variable speed motor 74 through a belt drive indicated at 75. The starch slurry is continuously withdrawn from the tank 66 through the outlet line 76 by means of a constant delivery pump 77 of known type and is delivered into the continuous starch paster 5 previously described in connection with Fig. 1 through the inlet connection 11.

High pressure steam is received from a steam generator (not shown) or other suitable source through the steam line 78 which is provided with a pressure reducing valve of known type 80 and a pressure gauge 81 and is delivered at reduced pressure (e. g., 100 pounds per square inch gauge) through the steam inlet pipe 13 into the paster 5. The starch is continuously pasted or modified in the paster 5 in accordance with the method described above in connection with Fig. 1 and is continuously discharged therefrom through the conduit 82 which is provided with a thermometer 83 in a suitable well and a regulating or throttle valve 84 of known type. The pasted starch is discharged into the recirculating line 85 leading to a fan pump indicated diagrammatically at 86. The furnish or stock from line 87 is introduced into the line 85 and the stock and starch paste are blended in the fan pump 86 and discharged through line 88 to the head box of the Fourdrinier machine.

The starch may be controllably pasted or modified in the paster 5 so as to obtain a paste having the exact characteristics desired for the particular type and grade of paper which is being manufactured. The paster 5 has been found to be particularly useful when set so as to produce a paste in which the component granules or cells have been pasted or modified to the extent that they are appreciably swollen to several times their original size but are still intact and have not broken up or disintegrated to any extent. The swollen granules have adherent surfaces and are of sizes such that practically all of them become trapped in the water-laid web formed on the screen 92 with very few of the granules passing with the waste water. As the paper web passes through the remainder of the paper machine and is subjected to heat in the driers and in passing over the calender rolls, the pasting of the granules is continued so that the starch in the finished paper product has the optimum properties.

Paper made in accordance with the usual process but with the incorporation of starch pasted into the paster device 5 in the manner described has been found to exhibit superior properties upon repeatedly testing, particularly in respect to internal bond, Mullen test, folding strength, excellency of printing and absence of fuzz.

The pasting device 5 may also be used to advantage in preparing starch pastes for use in sizing of textiles and producing starch pastes for use in the boxboard industry and for other purposes in which starch pastes of various types are required.

Vegetable gums such as locust bean gum may be pasted in the cooker 5 in the same way that starch is pasted.

It is will be appreciated and understood, as indicated above, that certain modifications and changes may be made in the embodiments of the invention described above in connection with the accompanying drawings. Accordingly, these particular embodiments are intended to be interpreted as illustrative and not in a limiting sense.

What is claimed as new is:

1. The continuous method of pasting starch which comprises, impacting a radially confined thin-walled tubular stream of an aqueous slurry of unpasted starch granules flowing in the tubular space between interfitting non-yielding inner and outer rigid members from the interior with a thin radially expanding jet of steam having a radial impact velocity at least several times greater than the velocity of said tubular stream.

2. The continuous method of pasting starch instantaneously in one step which comprises, impacting a radially confined thin-walled tubular stream of an aqueous slurry of unpasted starch flowing in the tubular space between interfitting non-yielding inner and outer rigid members from the interior with a thin radially expanding disk-shaped jet of steam having a radial impact velocity at least several times greater than the velocity of said stream of starch slurry and immediately thereafter passing the pasted starch into a turbulent zone of enlarged cross-section and filled only with a stream of the pasted starch.

3. The continuous method of pasting starch instantaneously in one step which comprises impacting a radially confined thin tubular stream of an aqueous slurry of unpasted starch flowing in the tubular space between interfitting non-yielding inner and outer rigid members from the interior with a thin radially expanding disk-shaped or cone-shaped jet of steam having a radial impact velocity at least several times greater than the velocity of said starch slurry resulting from an expansion ratio of at least two, the velocity and volume of said steam jet being sufficient to instantaneously paste the starch upon said impacting.

4. The continuous method of pasting starch instantaneously in one step which comprises impacting radially a confined thin annular stream of an aqueous slurry of unpasted starch flowing in the tubular space between interfitting non-yielding inner and outer rigid members with a thin jet of steam having an impact velocity of from about 1500 to 2000 feet per second, and immediately after said impact passing the slurry of pasted starch into a zone of enlarged cross-section filled only with a stream of the pasted starch where the thin stream becomes a relatively wide stream.

5. The continuous method of pasting starch instantaneously in one step comprising, expanding steam having a pressure substantially in excess of atmospheric into a thin jet having a velocity of about 1500 to 2000 feet per second and approximately atmospheric pressure and impacting radially a confined thin stream of an aqueous slurry of unpasted starch flowing in the tubular space between interfitting non-yielding inner and outer rigid members at approximately 90° to the direction of flow thereof with said thin jet of steam.

6. A continuous starch paster or cooker comprising, a first T-fitting the side connection of which is adapted to receive the discharge end of a starch slurry delivery line, a coupling screwed into the front end of said first T-fitting with the rear end of the coupling which is screwed into said T-fitting having a rearwardly flared interior surface, an elongated and hollow steam nozzle body having rearwardly and forwardly projecting portions and an intermediate plug portion which is screwed into the rear end of said first T-fitting so as to close the same, said forwardly projecting portion of said nozzle body extending coaxially and concentrically within said first T-fitting with the discharge end thereof being closed by a nozzle head comprising a nozzle ring member having a flat front face and a frusto-conical nozzle head having a flat rear face which is spaced from the front face of said nozzle ring so as to form a disk-shaped, radially expanding nozzle passage, the exterior surfaces of said nozzle discharge end and said nozzle ring forming a forwardly tapered annular starch slurry passageway the narrow and forward end of which opens into an abruptly expanding annular passageway formed between the exterior surface of said nozzle head and the opposing interior surface of said coupling, a nozzle control rod extending coaxially through said nozzle body the forward end of which projects through a central opening in said nozzle head so as to support the same thereon, means for securing said nozzle head on the forward end of said control rod, a support bearing for said control rod located in the forward end of said nozzle body, a second T-fitting having the front end thereof screwed onto said rearwardly projecting portion of said nozzle body, a stationary nut member screwed into the rear end of said second T-fitting, and a valve stem having a threaded portion which screws within the inner threads of said stationary nut member with the front end of said valve stem being interiorly threaded and screwed onto the threaded rear end of said nozzle control rod which projects rearwardly into the said second T-fitting, the side connection of said second T-fitting being adapted to receive the discharge end of a steam line.

7. The continuous starch paster or cooker of claim 6 wherein the circumferential bottom edge of said nozzle head is rounded and the diameter of the base of said nozzle head is slightly less than the diameter of the opposing front face of said nozzle ring whereby steam issuing from said nozzle passage tends to incline forwardly.

8. The continuous starch paster or cooker of claim 6 wherein there is a differential between the pitch of the threads on the exterior of said valve stem and the pitch of the threads on the rear end of said nozzle control rod, and wherein means are provided for preventing said nozzle control rod from turning.

9. A continuous starch paster or cooker comprising, means providing an elongated tubular chamber, a steam nozzle disposed in coaxial and concentric alignment within said chamber with the discharge end of the nozzle together with the discharge head thereof being recessed within the discharge end of said tubular chamber and with exterior surfaces of said nozzle discharge end and head and the opposing interior surface of said chamber providing a generally venturi-shaped annular passageway the outer end of which increases abruptly in width so as to be several times wider than the narrowest portion of the annular passageway, there being a starch inlet opening in said tubular chamber rearwardly of said nozzle discharge end a substantial distance whereby a forward flowing stream of starch slurry enters said venturi-shaped annular passageway, said nozzle comprising a nozzle ring member having a frusto-conical interior which narrows to a central steam outlet opening and having a flat front face from which is spaced a short distance the flat base surface of a frusto-conical nozzle head with the space therebetween forming a radially expanding, thin disk-shaped outlet passage discharging at approximately right angles into the narrowest portion of said venturi-shaped annular passageway, said nozzle ring member and said nozzle head being relatively adjustable so as to vary the width of said nozzle outlet passage.

References Cited in the file of this patent
UNITED STATES PATENTS

| | | |
|---|---|---|
| 1,535,702 | Walsh et al. | Apr. 28, 1925 |
| 1,947,295 | Jozsa | Feb. 13, 1934 |
| 2,072,375 | McCallum | Mar. 2, 1937 |
| 2,097,605 | Schierenbeck | Nov. 2, 1937 |
| 2,105,052 | Oltmans | Jan. 11, 1938 |
| 2,195,335 | Loginov | Mar. 26, 1940 |
| 2,313,574 | Payne | Mar. 9, 1943 |
| 2,582,198 | Etheridge | Jan. 8, 1952 |
| 2,661,195 | Van Bemmel et al. | Dec. 1, 1953 |